(12) United States Patent
Matthey-de-l'Endroit et al.

(10) Patent No.: US 10,643,131 B1
(45) Date of Patent: *May 5, 2020

(54) TRAINING VARIATIONAL AUTOENCODERS TO GENERATE DISENTANGLED LATENT FACTORS

(71) Applicant: DeepMind Technologies Limited, London (GB)

(72) Inventors: Loic Matthey-de-l'Endroit, London (GB); Arka Tilak Pal, London (GB); Shakir Mohamed, London (GB); Xavier Glorot, Montreal (CA); Irina Higgins, London (GB); Alexander Lerchner, London (GB)

(73) Assignee: DeepMind Technologies Limited, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/532,191

(22) Filed: Aug. 5, 2019

Related U.S. Application Data

(63) Continuation of application No. 15/600,696, filed on May 19, 2017, now Pat. No. 10,373,055.

(Continued)

(51) Int. Cl.
*G06K 9/46* (2006.01)
*G06N 3/08* (2006.01)
(Continued)

(52) U.S. Cl.
CPC .......... *G06N 3/084* (2013.01); *G06N 3/0454* (2013.01); *G06F 17/18* (2013.01); *G06K 9/4619* (2013.01)

(58) Field of Classification Search
CPC ........ G06N 3/08; G06N 3/084; G06N 3/0454; G06N 3/0445; G06F 17/18; G06K 9/4619; G06K 9/6256
(Continued)

(56) References Cited

U.S. PATENT DOCUMENTS 10,373,055 B1 * 8/2019 Matthey-de-l'Endroit .................. G06N 3/0454
2011/0208444 A1 8/2011 Solinsky
(Continued)

OTHER PUBLICATIONS

'www.cs.nyu.edu' [online] "Data for MATLAB hackers," Sam Rowels, Date: Unknown, [retrieved on Jun. 21, 2017] Retrieved from Internet: URL<http://www.cs.nyu.edu/~roweis/data.html> 3 pages.
(Continued)

*Primary Examiner* — Ali Bayat
(74) *Attorney, Agent, or Firm* — Fish & Richardson P.C.

(57) ABSTRACT

Methods, systems, and apparatus, including computer programs encoded on a computer storage medium, for training a variational auto-encoder (VAE) to generate disentangled latent factors on unlabeled training images. In one aspect, a method includes receiving the plurality of unlabeled training images, and, for each unlabeled training image, processing the unlabeled training image using the VAE to determine the latent representation of the unlabeled training image and to generate a reconstruction of the unlabeled training image in accordance with current values of the parameters of the VAE, and adjusting current values of the parameters of the VAE by optimizing a loss function that depends on a quality of the reconstruction and also on a degree of independence between the latent factors in the latent representation of the unlabeled training image.

20 Claims, 3 Drawing Sheets

Related U.S. Application Data

(60) Provisional application No. 62/339,753, filed on May 20, 2016.

(51) Int. Cl.
   *G06N 3/04* (2006.01)
   *G06F 17/18* (2006.01)
(58) Field of Classification Search
   USPC .......................................................... 382/159
   See application file for complete search history.

(56) References Cited

U.S. PATENT DOCUMENTS

| | | | |
|---|---|---|---|
| 2017/0046971 A1 | 2/2017 | Moreno | |
| 2017/0230675 A1 | 8/2017 | Wierstra et al. | |
| 2017/0345140 A1 | 11/2017 | Zhang et al. | |
| 2017/0351952 A1* | 12/2017 | Zhang | G06N 3/0454 |
| 2017/0365038 A1* | 12/2017 | Denton | G06T 5/00 |
| 2017/0371017 A1* | 12/2017 | Odry | G01R 33/5602 |
| 2018/0247200 A1* | 8/2018 | Rolfe | G06N 3/0454 |
| 2019/0018933 A1* | 1/2019 | Oono | G06N 7/08 |

OTHER PUBLICATIONS

Aubry et al. "Seeing 3d chairs: exemplar part-based 2d-3d alignment using a large dataset of cad models," CVPR, 2014, 8 pages.
Barlow et al. "Finding minimal entropy codes," Neural Computations 1.3, 1989, 12 pages.
Bengio et al. "Representation learning: A review and new perspectives," arXiv preprint arXiv1206.5538v3, Apr. 23, 2014, 30 pages.
Candy et al. "Retinal image quality and postnatal visual experience during infancy," Optom Vis Sci, 86(6) 2009.
Cheung et al. "Discovering hidden factors of variation in deep networks," arXiv preprint arXiv1412.6583v4, Jun. 17, 2015, 10 pages.
Cohen et al. "Learning the irreducible representations of commutative lie groups," ICML, Feb. 18, 2014, 9 pages.
Cohen et al. "Transformation properties of learned visual representations," arXiv preprint arXiv1412.7659v3 Apr. 7, 2015, 11 pages.
Desjardins et al. "Disentangling factors of variation via generative entangling," arXiv preprint arXiv1210.5474v1 Oct. 19, 2012, 10 pages.
Doersch. "Tutorial on Variational Autoencoders," arXiv preprint arXiv1606.05908v2, Aug. 13, 2016, 23 pages.
Duchi et al. "Adaptive subgradient methods for online learning and stochastic optimization," Journal of Machine Learning Research, Jul. 12, 2011, 39 pages.
Goroshin et al. "Learning to linearize under uncertainty," NIPS 2015, 9 pages.
Gross et al. "Multi-pie," Image and Vision Computing, 28(5) May 31, 2010, 8 pages.
Higgins et al "Early Visual Concept Learning with Unsupervised Deep Learning," arXiv preprint arXiv1606.05579v1, Jun. 17, 2016, 12 pages.
Higgins et al "Early Visual Concept Learning with Unsupervised Deep Learning," arXiv preprint arXiv1606.05579v2, Sep. 19, 2016.
Higgins et al "Early Visual Concept Learning with Unsupervised Deep Learning," arXiv preprint arXiv1606.05579v3, Sep. 20, 2016.
Higgins et al. "The roles of independent motion in object segmentation in the ventral visual stream: Learning to recognize the separate parts of the body," Vision Research, 51.6, Mar. 25, 2011, 10 pages.
Hinton et al. "Transibrming auto-encoders," International Conference on Artificial Neural Networks, 2011, 8 pages.
Karaletsos et al. "Bayesian representation learning with oracle constraints," arXiv preprint arXiv1506.05011v4, Mar. 1, 2016. 16 pages.
Kingma et al. "Adam: A method for stochastic optimization," arXiv preprint arXiv1412.6980v9, Jan. 30, 2017, 15 pages.
Kingma et al. "Auto-encoding variational bayes," arXiv preprint arXiv1312.6114v10, May 1, 2014, 14 pages.
Kulkarni et al. "Deep convolutional inverse gaphics network," NIPS 2015, 9 pages.
Lake et al. "Building machines that learn and think like people," arXiv preprint arXiv1604.00289v3, Nov. 2, 2016, 58 pages.
Leat et al. "Development of visual acuity and contrast sensitivity in children," Journal of Optometiy 2(1), Dec. 31, 2009, 8 pages.
Minh et al. "Human-level control through deep reinforcement learning," Nature 518(7540) Feb. 26, 2015, 13 pages.
Perry et al. "Continuous transformation learning of translation invariant representations," Experimental Brain Research 204.2, Jul. 1, 2010, 16 pages.
Reed et al. "Learning to disentangle factors of variation with manifold interaction." ICML, 2014, 9 pages.
Rezende et al. "Stochastic backpropagation and approximate inference in deep generative models," arXiv preprint arXiv1401.4082v3, May 30, 2014, 14 pages.
Rippel et al. "High-dimensional probability estimation with deep density models," arXiv preprint ar Xiv 1302.5125v1, Feb. 20, 2013, 12 pages.
Schmidhuber. "Learning factorial codes by predictability minimization," Neural Computation 4(6), Nov. 4, 1992, 11 pages.
Tang et al. "Tensor analyzers." Proceedings of the 30th International Conference on Machine Learning, Feb. 13, 2013, 9 pages.
Vasilescu et al. "Multilinear independent components analysis," CVPR 1, Jun. 20, 2005.
Whitney et al. "Understanding visual concepts with continuation learning," arXiv preprint arXiv1602.06822v1, Feb. 22, 2016. 4 pages.
Yang et al. "Weakly-supervised disentangling with recurrent transformation for 3d view synthesis," NIPS, 2015, 9 pages.
Zhu et al. "Multi-view perceptron: a deep model for learning face identity and view representations," Advances in Neural Information Processing Systems, 27, 2014, 9 pages.

* cited by examiner

TRAINING VARIATIONAL AUTOENCODERS TO GENERATE DISENTANGLED LATENT FACTORS

CROSS REFERENCE TO RELATED APPLICATIONS

This application is a continuation of U.S. application Ser. No. 15/600,696, filed on May 19, 2017, which claims priority to U.S. Provisional Application No. 62/339,753, filed on May 20, 2016. The disclosures of the prior applications are considered part of and are incorporated by reference in the disclosure of this application.

BACKGROUND

This specification relates to training recurrent neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

In general, one innovative aspect of the subject matter described in this specification can be embodied in methods performed by one or more computers for training a variational auto-encoder (VAE) to generate disentangled latent factors on a plurality of unlabeled training images, wherein the VAE is configured to receive an input image, process the input image to determine a latent representation of the input image that includes a plurality of latent factors, and to process the latent representation to generate a reconstruction of the input image, and wherein the methods include actions of receiving the plurality of unlabeled training images, and, for each unlabeled training image, processing the unlabeled training image using the VAE to determine the latent representation of the unlabeled training image and to generate a reconstruction of the unlabeled training image in accordance with current values of the parameters of the VAE, and adjusting current values of the parameters of the VAE by optimizing a loss function that depends on a quality of the reconstruction and also on a degree of independence between the latent factors in the latent representation of the unlabeled training image.

Other embodiments of this aspect can include one or more of the following optional features. In some implementations, the loss function is of the form L=Q−B(KL), where Q is a term that depends on the quality of the reconstruction, KL is a term that measures the degree of independence between the latent factors in the latent representation and the effective capacity of the latent bottleneck, and B is a tunable parameter. In some implementations, B is a value in the range between 2 exclusive and 250 inclusive. In some implementations, B is four. In some implementations, the value of B is dependent on a number of latent factors in the latent representation of the input image.

In some implementations, the generative factors are densely sampled from their respective continuous distributions among the plurality of unlabeled training images. In some implementations, the degree of independence between the latent factors is computed within a latent bottleneck with restricted effective capacity. In some implementations, the VAE includes a latent bottleneck layer and a capacity of the latent bottleneck layer is adjusted simultaneously with the degree of independence.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. Neural networks performing image reconstruction can perform more useful generalizations from training data to produce image reconstruction. Neural networks performing image construction can be trained to infer latent factors based on latent factors that are more statistically independent and interpretable and thus provide more disentangled information about the input images. A trained neural network can generate latent factors that can be used to perform different tasks without complete re-learning of low-level features for those tasks. A trained neural network can generate latent factors that can be recombined to generate new meaningful images that are significantly outside of a convex hull of training data used to train the neural network but can be specified as unseen combinations of latent factors obtained from the training data. A trained neural network can generate latent factors that can be used to perform more robustly in knowledge transfer scenarios, such as transfer scenarios that involve domain adaptation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
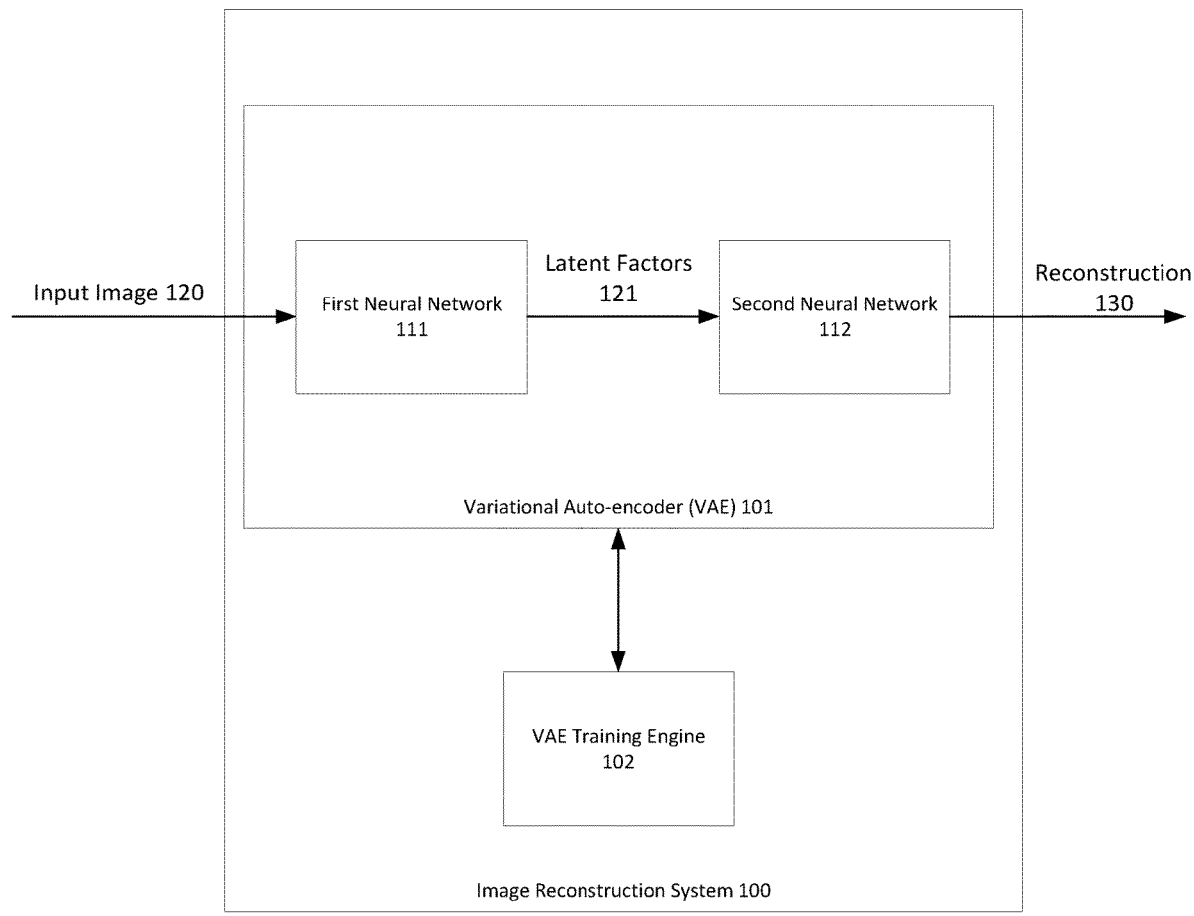
FIG. 1 is a block diagram of an example image reconstruction system.

FIG. 1 is a block diagram of an example image reconstruction system 100. The image reconstruction system 100 is an example of a system implemented as computer programs on one or more computers in one or more locations, in which the systems, components, and techniques described below can be implemented.

The image reconstruction system 100 is configured to receive as input an input image 120 and process that input to generate a reconstruction 130 of the input image 120. The image reconstruction system 100 performs this reconstruction using a variational auto-encoder (VAE) 101.

The VAE 101 includes a first neural network 111, e.g., an encoder, and a second neural network 112, e.g., a decoder. Each of first neural network 111 and the second neural network 112 is a neural network that can each include one or more neural network layers, including one or more fully connected layers, one or more convolutional layers, and/or one or more recurrent layers. Example VAE architectures are described in greater detail in Doersch, *Tutorial on Variational Autoencoders*, available at https://arxiv.org/pdf/1606.05908.pdf.

The first neural network 111 is configured to receive the input image 120 and process the input image 120 in accordance with a set of parameters to generate a set of latent factors 121 based on the input image 120. A latent factor 121 is any value that is defined by the outputs of the first neural network 111 based on processing the input image 120 by the first neural network 111. Once the VAE 101 is trained, the latent factors 121 can represent features of the input image 120. In some implementations, the latent factors 121 are a lower-dimension, i.e., compressed, version of the input image 120.

In some implementations, the first neural network 111 generates an output that, for each latent factor 121, parameterizes a distribution, e.g., a Gaussian distribution, over a set of possible values for the latent factor 121 and samples a value for the latent factor 121 from the distribution.

The second neural network 112 is configured to receive the latent factors 121 and process the latent factors in accordance with a set of parameters to generate a reconstruction 130 of the input image 120.

The neural network system 100 also includes a VAE training engine 102 that is configured to train the VAE 101 on training data by updating the parameters of the VAE 101, including the set of parameters of the first neural network 111 and the set of parameters of the second neural network 112.

The training engine 102 can train the VAE 101 to reduce the effective capacity of the latent bottleneck and to increase statistical independence between the latent factors 121. When latent factors 121 are statistically independent from each other, the latent factors 121 contain less redundant information and more disentangled information that can be used to perform useful generalizations from the input image 120 to generate the reconstruction 130 of the input image 120 or to perform other tasks.

Training a VAE is described in greater detail below with reference to FIG. 2.

Figure 2:
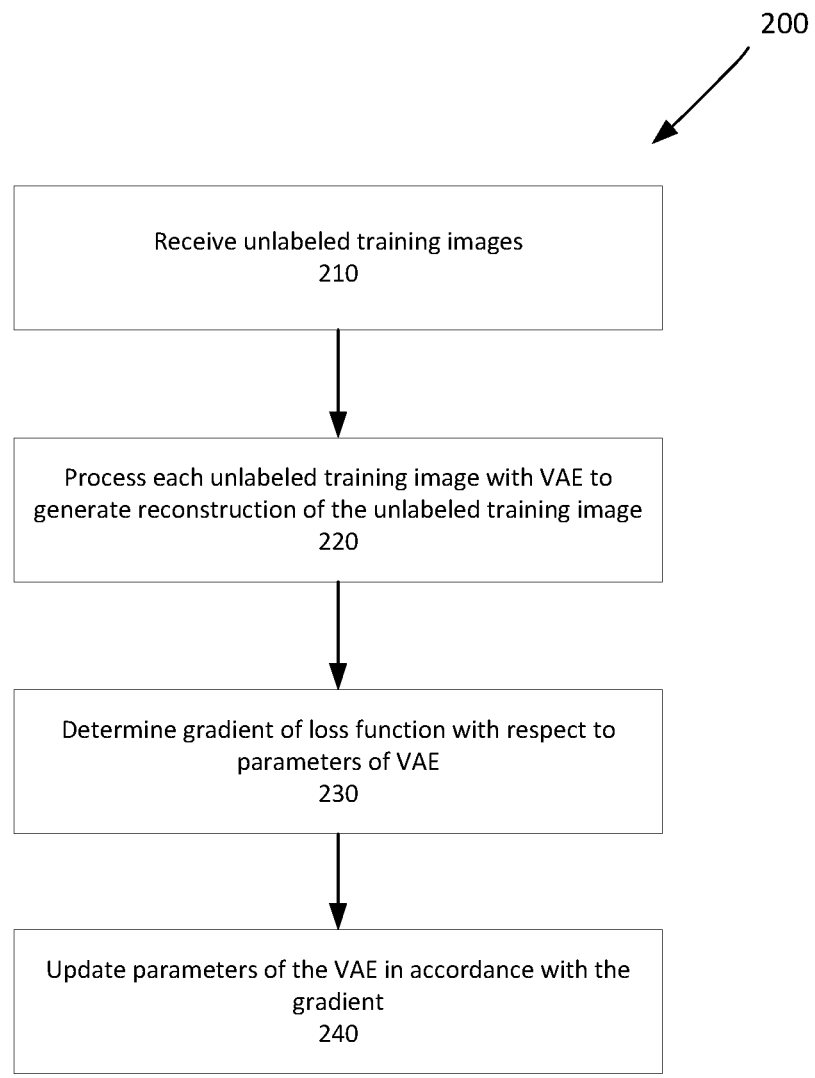
FIG. 2 is a flow diagram of an example process for training a variational auto-encoder.

FIG. 2 is a flow diagram of an example process 200 for training a variational auto-encoder. For convenience, the process 200 will be described as being performed by a system of one or more computers located in one or more locations. For example, an image reconstruction system, e.g., image reconstruction system 100 of FIG. 1, appropriately programmed in accordance with this specification, can perform the process 200.

The system receives a set of unlabeled training images (210) and processes each unlabeled training image using a VAE, e.g., the VAE 101 of FIG. 1, to generate an output image corresponding to the unlabeled image (220). The VAE generates the output image based on the current values of the parameters of VAE.

The system can process each unlabeled training image using a first neural network of the VAE, e.g., the first neural network 111 of the VAE 101 of FIG. 1, to generate a latent representation of the unlabeled training image and process the latent representation using a second neural network of the VAE, e.g., the second neural network 112 of the VAE 101 of FIG. 1, to generate the output image corresponding to the unlabeled training image.

An encoder of the VAE can generate an output that defines a distribution over a set of possible values for the latent factors and samples latent factors from that distribution. The decoder can use the sampled latent factors to generate an output that can be a reconstruction of an input image.

The system determines a gradient of a loss function for the VAE with respect to parameters of the VAE for a batch of images in the set of unlabeled training images (230). Determining the gradient of the loss function for the VAE is described in greater detail below with reference to FIG. 3.

The system updates the current values of the parameters of the VAE using the gradient of the loss function for each image in the set of unlabeled training images (240). In some implementations, the system backpropagates the gradient through layers of the VAE, including layers of the neural networks in the VAE, and at each layer updates the parameters of the VAE using gradient descent.

The system can repeat the process 200 for multiple sets of training images, i.e., multiple batches of training images, to determine trained values of the parameters of the VAE from initial values of the parameters.

Figure 3:
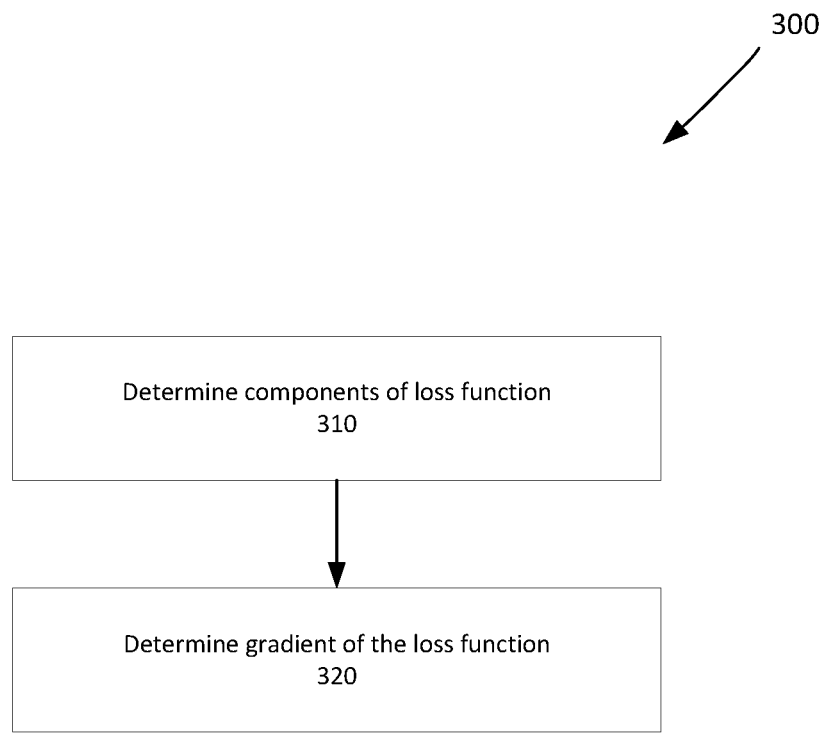
FIG. 3 is a flow diagram of an example process for determining gradient of a loss function for a variational auto-encoder.

FIG. 3 is a flow diagram of an example process 300 for determining a gradient of a loss function for a variational auto-encoder. For convenience, the process 300 will be described as being performed by a system of one or more computers located in one or more locations. For example, an image reconstruction system, e.g., image reconstruction system 100 of FIG. 1, appropriately programmed in accordance with this specification, can perform the process 300.

The system determines components of a loss function for a training image (310). The loss function is a function that generates a measure of error for an output of the VAE as a function of the parameters of the VAE.

Generally, the components of the loss function include a measure of quality of reconstruction in an output of VAE, a measure of degree of independence between latent factors generated by the VAE, and a measure of enhanced learning factor.

The measure of quality of re-construction describes a difference between an input image to the VAE and an output image generated by the VAE as the reconstruction of the input image.

In some implementations, the measure of quality of reconstruction is calculated using the following equation:

$$Q = E_{q_\phi(z|x)}[\log p_\theta(x|z)],$$

where $E_{q_\phi(z|x)}[\log p_\theta(x|z)]$ is a cross-entropy between the probability distribution $p_\theta(x|z)$ and the true data distribution $p(x)$ on average over all values of $q_\phi(z|x)$, $q_\phi(z|x)$ is a probability distribution assigned to latent factors defined by the output of an encoder of the VAE and sampled by a decoder of the VAE given the training image, i.e., a probability distribution defined by the output of the encoder, $\phi$ includes the parameters of the encoder, $p_\theta(x|z)$ is probability distribution assigned to output of the decoder given the sampled latent factors, and θ includes the parameters of the decoder.

The measure of the degree of independence of the latent factors generated by the VAE describes the degree to which latent factors are statistically independent from each other. For example, the measure of the degree of independence of the latent factors can describe the degree to which latent factors are statistically independent from each other under restricted latent bottleneck capacity. The measure of the degree of independence can affect the bottleneck capacity.

In some implementations, an encoder of the VAE has a last layer that generates the output that defines the distribution from which latent factors are sampled. This layer serves as a bottleneck for the VAE because only information captured by the output of that layer can be used in the reconstruction of the input image. The bottleneck layer can be a layer of the decoder that has the smallest number of neurons. The capacity of the bottleneck layer, i.e., the latent bottleneck capacity of the VAE, can affect the ability of the VAE to perform useful generalizations and/or to produce accurate image reconstructions.

When latent factors obtained from an input image are more statically independent from each other, e.g., within a restricted capacity information bottleneck, the latent factors contain less redundant information and more disentangled information that can be used to perform useful generalizations from observed data to generate unobserved data. The system can determine the measure of the degree of independence and/or effective bottleneck capacity based on a divergence between a probability distribution defined by the output of the encoder and a prior probability distribution such as a unit probability distribution.

For example, the system can determine the measure of the degree of independence D using the following equation:

$$D = D_{KL}(q_\phi(z|x) \| p(z)),$$

where $D_{KL}(q_\phi(z|X) \| p(z))$ is a Kullback-Leibler divergence between probability distributions $q_\phi(z|x)$ and $p(z)$, $q_\phi(z|x)$ is a probability distribution defined by the output of an encoder of the VAE, $\phi$ includes the parameters of the decoder, and $p(z)$ is a prior probability distribution over the latent factors, such as an isotropic unit Gaussian distribution over the latent variables.

The measure of enhanced learning pressure is applied to the measure of degree of independence between latent factors to set the aggressiveness by which the system enforces independence between latent factors and the constriction on the effective size of the latent bottleneck in the loss function.

Generally, the measure of enhanced learning pressure is a value that is greater than one.

In some implementations, the measure of enhanced learning pressure is a value in the range of (2, 250] (2 exclusive to 250 inclusive), e.g., 4.

If the measure of enhanced learning pressure is zero or very low, the system does not enforce any or much independence between latent factors in the loss function. This can lead to situations where the system generates latent factors that are not statistically independent and thus do not convey a disentangled representation of the input image. Therefore, using a very low measure of enhanced learning pressure can reduce the power of the system to perform useful generalizations from the input image.

Experimental results show that a using a measure of enhanced learning pressure of one also fails to produce adequate independence between latent factors and thus fails to enable the system to perform adequate useful generalizations from the input image. In the conducted experiments, using a measure of enhanced learning pressure of one produced a measured accuracy level of around 60 percent for the output of the system, while using a measure of enhanced learning pressure of four produced a measured accuracy level of more than 90 percent.

To determine the measured accuracy level in this case, a training engine can use a training data set including multiple images, where each image is generated using a set of data generative factors that is the same as the set of data generative factors used to generate a previous image except for one randomly selected data generative factor. The training engine can train a classifier to identify which data generative factors were unchanged between a pair of images in the data set using values obtained from latent factors generated by a VAE in accordance with the measure of enhanced learning pressure of the VAE.

For example, the training engine can collect data for the classifier by specifying two vectors of data generative factors in which every factor was randomly sampled, except for fixed factor. The training engine can then find two images in the training set that corresponded to the factor specifications of the two specified vectors. The training engine can run inference on the trained VAE using these images to find two corresponding latent factor vectors. The system can then subtract one of these inferred latent vectors from the other and compute the absolute value of the difference. The training engine can perform such pairwise operations for a batch of randomly sampled vectors, each time fixing the same latent factor. The training engine can compute an average of the absolute difference vectors computed using multiple image pairs and supply the average as an input to the classifier. The training engine can repeat this his process for different latent factors until the classifier is appropriately trained to convergence. The measured accuracy level of the trained classifier can be the measure of enhanced learning pressure.

In some implementations, the measure of enhanced learning pressure is set in a manner that causes the loss function to enforce a degree of independence between latent factors equivalent to the independence of latent factors learned using the ventral visual stream in humans.

In some implementations, the loss function has the form $L(\theta, \varnothing, x) = Q - \beta D$, where θ and ∅ are parameters of an encoder and a decoder of the VAE respectively, Q is the measure of quality of reconstruction of an output generated by the VAE, β is the measure of enhanced precision, and D is the measure of a degree of independence between latent factors generated by the VAE.

The system determines a gradient of the loss function with respect to the parameters of the VAE (320). In some implementations, the system determines a gradient of each component of the components of the loss function and aggregates each component gradient to generate the gradient of the loss function.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for training a variational auto-encoder (VAE) to generate disentangled latent factors on a plurality of unlabeled training images,
    wherein the VAE has a plurality of parameters and is configured to receive an input image, process the input image to determine a latent representation of the input image that includes a plurality of latent factors, and to process the latent representation to generate a reconstruction of the input image, and
    wherein the method comprises:
        receiving the plurality of unlabeled training images, and, for each unlabeled training image:
        processing the unlabeled training image using the VAE to determine the latent representation of the unlabeled training image and to generate a reconstruction of the unlabeled training image in accordance with current values of the parameters of the VAE, and
        adjusting current values of the parameters of the VAE by determining a gradient of a loss function with respect to the parameters of the VAE, wherein the loss function L is of the form L=Q−B(KL), where Q is a term that depends on a quality of the reconstruction of the unlabeled training image, KL is a term that measures a degree of independence between the latent factors in the latent representation of the unlabeled training image, and B is a fixed value that is greater than one.

2. The method of claim 1, further comprising, after the VAE has been trained, using latent representations generated by the VAE as features of input images.

3. The method of claim 1, wherein KL is a Kullback-Leibler divergence between probability distributions $q\phi(z|x)$ and $p(z)$, $q\phi(z|x)$ is a probability distribution defined by the output of an encoder of the VAE and $p(z)$ is a prior probability distribution over the latent factors.

4. The method of claim 1, wherein B is a value in a range of 2, exclusive, to 250, inclusive.

5. The method of claim 4, wherein B is four.

6. The method of claim 1, wherein the value of B is dependent on a number of latent factors in the latent representation of the input image.

7. The method of claim 1, wherein the degree of independence between the latent factors is computed within a latent bottleneck with restricted effective capacity.

8. The method of claim 1, wherein the VAE includes a latent bottleneck layer, the KL term also measures the capacity of the latent bottleneck layer, and the capacity of the latent bottleneck layer is adjusted simultaneously with the degree of independence.

9. A system comprising one or more computers and one or more storage devices storing instructions that are operable, when executed by the one or more computers, to cause the one or more computers to perform operations for training a variational auto-encoder (VAE) to generate disentangled latent factors on a plurality of unlabeled training images, wherein the VAE has a plurality of parameters and is configured to receive an input image, process the input image to determine a latent representation of the input image that includes a plurality of latent factors, and to process the latent representation to generate a reconstruction of the input image, and wherein the operations comprise:
    receiving the plurality of unlabeled training images, and, for each unlabeled training image:
        processing the unlabeled training image using the VAE to determine the latent representation of the unlabeled training image and to generate a reconstruction of the unlabeled training image in accordance with current values of the parameters of the VAE, and
        adjusting current values of the parameters of the VAE by determining a gradient of a loss function with respect to the parameters of the VAE, wherein the loss function L is of the form L=Q−B(KL), where Q is a term that depends on a quality of the reconstruction of the unlabeled training image, KL is a term that measures a degree of independence between the latent factors in the latent representation of the unlabeled training image, and B is a fixed value that is greater than one.

10. The system of claim 9, the operations further comprising, after the VAE has been trained, using latent representations generated by the VAE as features of input images.

11. The system of claim 9, wherein KL is a Kullback-Leibler divergence between probability distributions $q\phi(z|x)$ and $p(z)$, $q\phi(z|x)$ is a probability distribution defined by the output of an encoder of the VAE and $p(z)$ is a prior probability distribution over the latent factors.

12. The system of claim 9, wherein B is a value in a range of 2, exclusive, to 250, inclusive.

13. The system of claim 12, wherein B is four.

14. The system of claim 9, wherein the degree of independence between the latent factors is computed within a latent bottleneck with restricted effective capacity.

15. The system of claim 9, wherein the VAE includes a latent bottleneck layer, the KL term also measures a capacity of the latent bottleneck layer, and the capacity of the latent bottleneck layer is adjusted simultaneously with the degree of independence.

16. A non-transitory computer-readable storage medium encoded with instructions that, when executed by one or more computers, cause the one or more computers to perform operations for training a variational auto-encoder (VAE) to generate disentangled latent factors on a plurality of unlabeled training images, wherein the VAE is configured to receive an input image, process the input image to determine a latent representation of the input image that includes a plurality of latent factors, and to process the latent representation to generate a reconstruction of the input image, and wherein the operations comprise:

receiving the plurality of unlabeled training images, and, for each unlabeled training image:

processing the unlabeled training image using the VAE to determine the latent representation of the unlabeled training image and to generate a reconstruction of the unlabeled training image in accordance with current values of the parameters of the VAE, and adjusting current values of the parameters of the VAE by determining a gradient of a loss function with respect to the parameters of the VAE, wherein the loss function L is of the form L=Q−B(KL), where Q is a term that depends on a quality of the reconstruction of the unlabeled training image, KL is a term that measures a degree of independence between the latent factors in the latent representation of the unlabeled training image, and B is a fixed value that is greater than one.

17. The computer-readable storage medium of claim 16, the operations further comprising, after the VAE has been trained, using latent representations generated by the VAE as features of input images.

18. The computer-readable storage medium of claim 16, wherein KL is a Kullback-Leibler divergence between probability distributions $q\phi(z|x)$ and $p(z)$, $q\phi(z|x)$ is a probability distribution defined by the output of an encoder of the VAE and $p(z)$ is a prior probability distribution over the latent factors.

19. The computer-readable storage medium of claim 16, wherein B is a value in a range of 2, exclusive, to 250, inclusive.

20. The computer-readable storage medium of claim 16, wherein the VAE includes a latent bottleneck layer, the KL term also measures a capacity of the latent bottleneck layer, and the capacity of the latent bottleneck layer is adjusted simultaneously with the degree of independence.

\* \* \* \* \*